Patented May 17, 1938

2,117,513

UNITED STATES PATENT OFFICE 2,117,513

ABRASIVE WHEEL AND METHOD OF MAKING THE SAME

Arthur G. Scutt, Niagara Falls, and Albert L. Ball, Lewiston Heights, N. Y., assignors, by mesne assignments, to The Carborundum Company, Niagara Falls, N. Y., a corporation of Delaware No Drawing. Application November 27, 1935, Serial No. 51,884

10 Claims. (Cl. 51—280)

This invention relates to methods of manufacture of abrasive articles containing particles of very hard and costly abrasive material, and to the improved abrasive articles obtained thereby. The invention is more particularly concerned with and illustrated by the improvement in the cutting or abrading efficiency of wheels by control of the materials which are mixed with the abrasive particles and the bond in making up the abrasive mix.

It has been discovered that the excellence of an abrasive article, for example one containing diamonds, is affected to an unforeseen degree by the character of the filler which is added along with the diamond particles and the bond in making up the mixture which is to be molded to make the abrasive article. The value of the filler in these abrasive articles may be considered from three viewpoints which will be discussed in more detail below:

1. Cutting rate.
2. Efficiency ratio.
3. Efficiency per carat.

The cutting rate under given conditions of speed and of material to be ground may be defined as the mass of a given material that is ground off in unit time. This datum is of importance because it gives an indication of the speed with which a grinding operation can be accomplished.

The efficiency ratio under given conditions of speed and of material to be ground may be defined as the mass of material removed from the work piece divided by the mass lost from the abrasive article during the same operation. For example if 20 grams of a hard carbide composition (such as a sintered tungsten carbide tool tip) are cut away with a loss of one gram of the abrasive article, the efficiency ratio is twenty. The efficiency ratio is of importance in judging the probable life of the diamond wheel under given working conditions.

Another measure of efficiency, in which the criterion is the weight of diamond used, is the quotient obtained by dividing the number of grams of material removed from the work piece by the number of carats of diamond particles lost from the abrasive article as a result of this work of abrasion. This datum is of importance from the viewpoint of the economical use of the diamond material.

In the attempt to improve the rate of cutting and the efficiency of abrasive articles containing diamond particles, it has been discovered that improved results are obtained (for example in the case of resin-bonded diamond wheels) when part of the resin entering into the composition of the abrasive article is hardened as a preliminary step, then crushed, and subsequently used as a filler in the mixture of abrasive grain and bond which is molded to form the abrasive article. These steps in the process of manufacture of the abrasive article may be illustrated as follows:

3 parts of phenolic condensation product resin (such as that known to the trade as "Bakelite" No. BR-2417) are mixed with 1 part of denatured grain alcohol. The mixture is placed in a container in an oven and subjected to the temperature schedule of the accompanying table:

150° F. for 24 hours.
200° F. for 24 hours.
250° F. for 24 hours.
300° F. for 96 hours.

The result of this temperature treatment is to cure the phenol condensation product resin to the so-called C stage in which it is infusible and insoluble in most solvents. No time-temperature control need be maintained in cooling the cured resin to room temperature. The crushing can be performed by any of the well known standard methods. This previously cured and crushed resin is employed according to the present invention as a filler to replace wholly or in part the fillers ordinarily used in manufacturing diamond wheels.

The following Formula A is given as an example of constituents that can be used in making an abrasive article in accordance with the present invention:

Formula A

| | Percent |
|---|---|
| Diamond particles capable of passing through a No. 80 mesh screen but held on a No. 200 mesh screen | 10 |
| Fused alumina particles capable of passing through a No. 80 mesh screen but held on a No. 200 mesh screen | 22 |
| Reactive phenol condensation product resin | 12 |
| A filler consisting of previously cured and crushed phenol condensation product resin | 56 |

The above formula is particularly suitable if the wheel is to have the abrasive material on a side face.

If the abrasive material is carried on the periphery of the wheel mounting the following Formula B can be used.

Formula B

| | Percent |
|---|---|
| Diamond particles capable of passing through a No. 80 mesh screen but held on a No. 200 mesh screen | 22 |
| Fused alumina particles capable of passing through a No. 80 mesh screen but held on a No. 200 mesh screen | 10 |
| Reactive phenol condensation product resin | 15 |
| A filler consisting of previously cured and crushed phenol condensation product resin | 53 |

The constituents are thoroughly mixed, molded under heat and pressure to cure the bond substantially to the C stage.

In order to make a comparison between abrasive articles made according to the present invention and abrasive articles made under similar conditions except for the character of the filler, abrasive wheels were made up and tested under similar conditions, with the results given in Table I.

Table I

| Diamond abrasive | Secondary abrasive | Bond | Fillers | Cutting rate | Efficiency ratio | Grams metal removed per carat of diamonds |
|---|---|---|---|---|---|---|
| Percent 10 | Percent 22 | Percent 12 | 56% cured and crushed resin. | .22 | 40 | 80 |
| 10 | 22 | 12 | 56% wood flour | .22 | 11 | 22 |

In determining the efficiency ratio the wheel whose performance is required is mounted for revolution at a predetermined speed, and a standard object to be ground is reciprocated across the working surface of the wheel under conditions that will distribute the wear as much as possible over the working surface. The object to be ground may be a block of very hard metal or a block of cemented carbide, such as cemented tungsten carbide mounted on a metal support. Working conditions are equalized in certain ways. For example the pressure between the work piece and the wheel is produced by means of a lever which is acted on by a standard weight placed in a standard position with respect to the work piece and to the pivot of the lever. For the purpose of calculating the efficiency ratio the grinding wheel is weighed before and after the determination. The work piece is also weighed before and after the determination. The work piece should be of similar character in the case of any two wheels which are compared.

In Table I the cutting rate is expressed in grams of metal removed per minute. The efficiency ratio is expressed in grams of metal removed per gram of wheel worn away. While the cutting rate was the same for the two wheels, the efficiency ratio was nearly four times as great for the wheel containing a filler of cured and crushed resin as that for the wheel containing wood flour as a filler.

In Table II are given the results of a surface grinding test made with an abrasive wheel ½" in width and 7" in diameter. In this case the amount of bond and filler used formed sixty per cent of the mass of the abrasive mix for each wheel.

Table II

| Diamond abrasive | Bond | Filler | Cutting rate | Efficiency ratio in gms. of metal removed per carat of diamond worn away |
|---|---|---|---|---|
| Percent 40 | Percent 25 | 35% flint | 1.15 | 10.2 |
| 40 | 12 | 48% cured and crushed resin. | 1.16 | 16.55 |

In the above example the cured resin is crushed and placed in a 100 mesh screen, the number referring to the meshes to the linear inch. The resin particles which pass through the screen are used in making up the abrasive mix.

About 62 per cent more metal was ground away in the case of the second wheel than was ground away by the first wheel with the same mass of diamond particles worn away. It is evident, therefore, that considerable economy in the use of diamonds can be effected by employing the bond and filler used for the second wheel as compared with those used for the first wheel.

A possible explanation for the improved efficiency observed for the abrasive articles made by utilizing the discovery disclosed may be that the hard abrasive particles are embedded in a retaining matrix which possesses the correct degree of cohesion, elasticity and resistance to shock, with the result that each particle performs its work with a high degree of effectiveness.

In view of the high cost of diamonds and of abrasive articles containing a considerable proportion of diamonds, it will be generally recognized that methods of manufacture which result in longer life of the wheel and which result in greater grinding efficiency are important to the manufacturer of such abrasive articles. The resultant article is correspondingly important to the customer.

Many changes may be made in the relative proportions of abrasives, bond and filler without departing from the invention defined within the compass of the following claims.

We claim:—

1. An abrasive article comprising particles of hard abrasive, a filler of condensation resin that was cured to a substantially infusible condition and comminuted before admixture with abrasive particles, and a binder of synthetic resin cured in intimate contact with the abrasive particles and the precured resinous filler.

2. An abrasive article comprising particles of very hard abrasive, additional abrasive particles of a lower degree of hardness, a filler of condensation resin that was cured to a substantially infusible condition and comminuted before admixture with abrasive particles, and a binder of synthetic resin cured in intimate contact with the abrasive particles and the precured resinous filler.

3. An abrasive article comprising particles of hard abrasive, a filler of finely divided phenol condensation product resin which has been precured to the C stage and subsequently pulverized, and a binder of phenol condensation product resin which has been cured to the C stage in intimate contact with the abrasive particles and the precured filler.

4. An abrasive article comprising particles of a very hard abrasive, additional abrasive particles of a lower degree of hardness, a filler of finely divided phenol condensation product resin which has been precured to the C stage and subsequently pulverized, and a binder of phenol condensation resin which has been cured to the C stage in intimate contact with the abrasive particles and the precured filler.

5. An abrasive article comprising diamond particles, a filler of condensation resin that was cured to a substantially infusible condition and comminuted before admixture with diamond particles, and a binder of synthetic resin cured in intimate contact with the diamond particles and the precured resinous filler.

6. An abrasive article comprising diamond particles, a filler of finely divided phenol condensation product resin that was cured to a substantially infusible condition and comminuted before admixture with diamond particles, and a binder of phenol condensation product resin cured in contact with the diamond particles and the precured resinous filler.

7. An abrasive article comprising diamond particles, a filler composed of phenol condensation product resin that has been cured to the C stage and subsequently reduced to a finely divided form, and a binder of phenol condensation product resin cured in contact with the diamond particles and the resinous filler.

8. An abrasive article comprising particles of costly abrasive material, a filler of synthetic resin that was hardened to the infusible condition by prolonged heating and subsequently comminuted before admixture with the abrasive particles, and a binder of heat hardened synthetic resin that has been cured to the infusible stage in intimate contact with the abrasive particles and the precured resinous filler.

9. An abrasive article comprising particles of very hard and costly abrasive, additional abrasive particles of a less degree of hardness, a filler of synthetic resin that was hardened to the infusible condition by prolonged heating and subsequently comminuted before admixture with the abrasive particles, and a binder of heat hardened synthetic resin that has been cured to the infusible stage in intimate contact with the abrasive particles and the precured resinous filler.

10. The method of obtaining high efficiency in a diamond wheel per carat of diamonds worn away which comprises blending diamond particles with a filler composed of particles having a hardness of about 9 on the Mohs scale and a synthetic resin that was precured to the infusible stage and subsequently comminuted before admixture with abrasive particles, the mass of the filler substantially exceeding the mass of diamond particles, and bonding the mixture of diamond particles and filler by means of a reactive phenol condensation product resin which is hardened in intimate contact with the blended particles.

ARTHUR G. SCUTT.
ALBERT L. BALL.